US011938852B2

(12) United States Patent
Kamei et al.

(10) Patent No.: US 11,938,852 B2
(45) Date of Patent: Mar. 26, 2024

(54) SENSOR DISPOSITION STRUCTURE IN SEAT

(71) Applicant: TS TECH CO., LTD., Asaka (JP)

(72) Inventors: Soichiro Kamei, Shioya-gun (JP); Hiromi Taniguchi, Shioya-gun (JP); Koji Onuma, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/115,038

(22) Filed: Feb. 28, 2023

(65) Prior Publication Data
US 2023/0202365 A1 Jun. 29, 2023

Related U.S. Application Data

(63) Continuation of application No. 17/689,094, filed on Mar. 8, 2022, now Pat. No. 11,628,756, which is a continuation of application No. 16/934,114, filed on Jul. 21, 2020, now Pat. No. 11,299,077, which is a continuation of application No. 15/855,132, filed on Dec. 27, 2017, now Pat. No. 10,752,144.

(30) Foreign Application Priority Data

Jul. 31, 2017 (JP) ................................ 2017-147693

(51) Int. Cl.
*B60N 2/68* (2006.01)
*B60N 2/00* (2006.01)
*B60N 2/56* (2006.01)

(52) U.S. Cl.
CPC ............ *B60N 2/686* (2013.01); *B60N 2/002* (2013.01); *B60N 2/5621* (2013.01); *B60Y 2400/306* (2013.01)

(58) Field of Classification Search
CPC ............ B60Y 2400/306; B60N 2/5621; B60N 2/686; B60N 2/002; B60R 2022/4858
See application file for complete search history.

(56) References Cited

U.S. PATENT DOCUMENTS

| | | | |
|---|---|---|---|
| 2,366,680 A | 1/1945 | Valentine et al. | |
| 9,630,525 B2 | 4/2017 | Nakazaki et al. | |
| 2006/0091657 A1 | 5/2006 | Sallam et al. | |
| 2007/0063551 A1* | 3/2007 | Gasic | B60N 2/5635 297/180.1 |
| 2007/0267282 A1 | 11/2007 | Sallam et al. | |
| 2008/0204264 A1 | 8/2008 | Sakai | |

(Continued)

FOREIGN PATENT DOCUMENTS

| | | |
|---|---|---|
| CN | 202896500 U | 4/2013 |
| CN | 204821443 U | 12/2015 |

(Continued)

OTHER PUBLICATIONS

Mar. 6, 2018 Office Action issued in Patent Application No. 2017-147693.

(Continued)

*Primary Examiner* — Milton Nelson, Jr.
(74) *Attorney, Agent, or Firm* — Oliff PLC

(57) ABSTRACT

A sensor disposition structure in a seat includes a cushion pad and a board-like member which is disposed under the cushion pad. A concave is formed in an upper surface of the board-like member, and a sensor is disposed in the concave.

6 Claims, 10 Drawing Sheets

(56) References Cited

U.S. PATENT DOCUMENTS

| | | | |
|---|---|---|---|
| 2010/0192698 A1 | 8/2010 | Hansen et al. | |
| 2014/0246887 A1 | 9/2014 | Clos et al. | |
| 2015/0137569 A1 | 5/2015 | Goedert | |
| 2015/0274049 A1* | 10/2015 | Langensiepen | B60N 2/5642 297/180.12 |
| 2015/0283922 A1 | 10/2015 | Kordel et al. | |
| 2015/0283923 A1 | 10/2015 | Kordel et al. | |
| 2015/0291072 A1 | 10/2015 | Ito | |
| 2016/0207431 A1 | 7/2016 | Abe et al. | |
| 2018/0086228 A1 | 3/2018 | Nakazaki et al. | |
| 2020/0290483 A1 | 9/2020 | Nakazaki et al. | |

FOREIGN PATENT DOCUMENTS

| | | |
|---|---|---|
| CN | 204845843 U | 12/2015 |
| DE | 20 2013 010947 U1 | 2/2014 |
| EP | 3508375 A1 | 7/2019 |
| JP | H03-016550 U | 2/1991 |
| JP | 2006-029932 A | 2/2006 |
| JP | 2010-125121 A | 6/2010 |
| JP | 2011-105278 A | 6/2011 |
| JP | 2014-100941 A | 6/2014 |
| JP | 2014-100943 A | 6/2014 |
| JP | 2014-231256 A | 12/2014 |
| JP | 2015-009751 A | 1/2015 |
| JP | 2015-013613 A | 1/2015 |
| JP | 2016-68841 A | 5/2016 |
| JP | 2016-088471 A | 5/2016 |
| JP | 2016-094119 A | 5/2016 |
| JP | 2016-144989 A | 8/2016 |
| JP | 2017001455 A | 1/2017 |
| JP | 2017-033780 A | 2/2017 |

OTHER PUBLICATIONS

Mar. 6, 2018 International Search Report issued in Patent Application No. PCT/JP2017/043543.
May 15, 2018 Decision to Grant issued in Japanese Patent Application No. 2017-147693.
Aug. 19, 2019 Office Action issued in Chinese Patent Application No. 201780050272.4.
Mar. 29, 2021 Extended Search Report issued in European Patent Application No. 17 91 9753.8.
Nov. 2, 2021 Office Action issued in Japanese Patent Application No. 2019-029053.
Jun. 14, 2022 Search Report issued in Brazilian Patent Application No. BR112020000455-3.
May 26, 2022 Office Action issued in Chinese Patent Application No. 202010027641.1.
Nov. 10, 2022 Office Action issued in Chinese Patent Application No. 202010027641.1.
Nov. 18, 2022 Office Action issued in Chinese Patent Application No. 202010202314.5.
Nov. 14, 2022 Office Action issued in Malaysia Patent Application No. PI2020000337.
Feb. 21, 2023 Extended European Search Report issued in European Application No. 22205076.7.
Jul. 4, 2023 Office Action issued in Japanese Patent Application No. 2022-109373.

\* cited by examiner

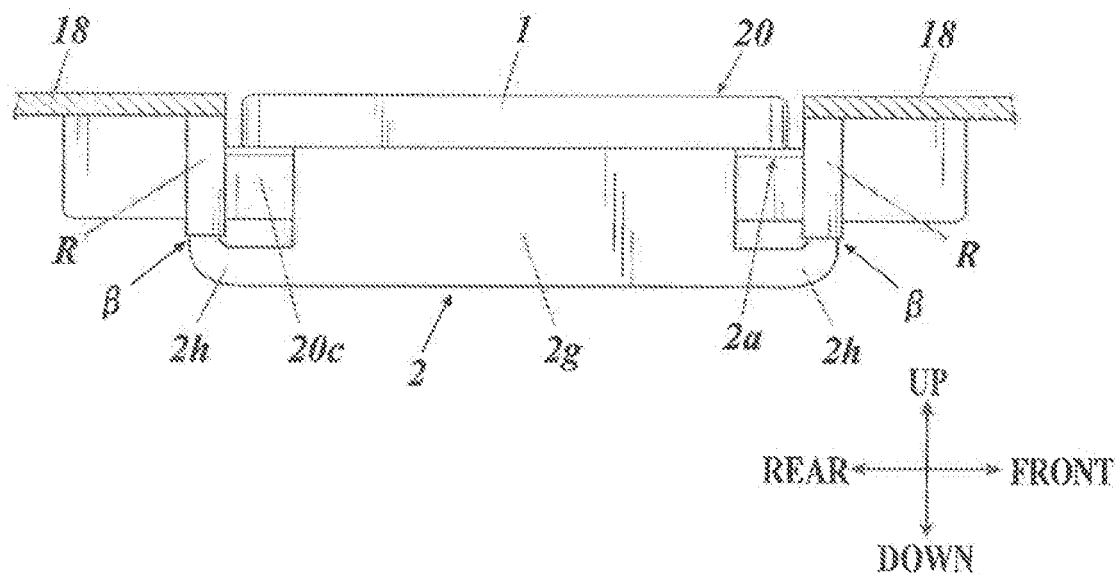
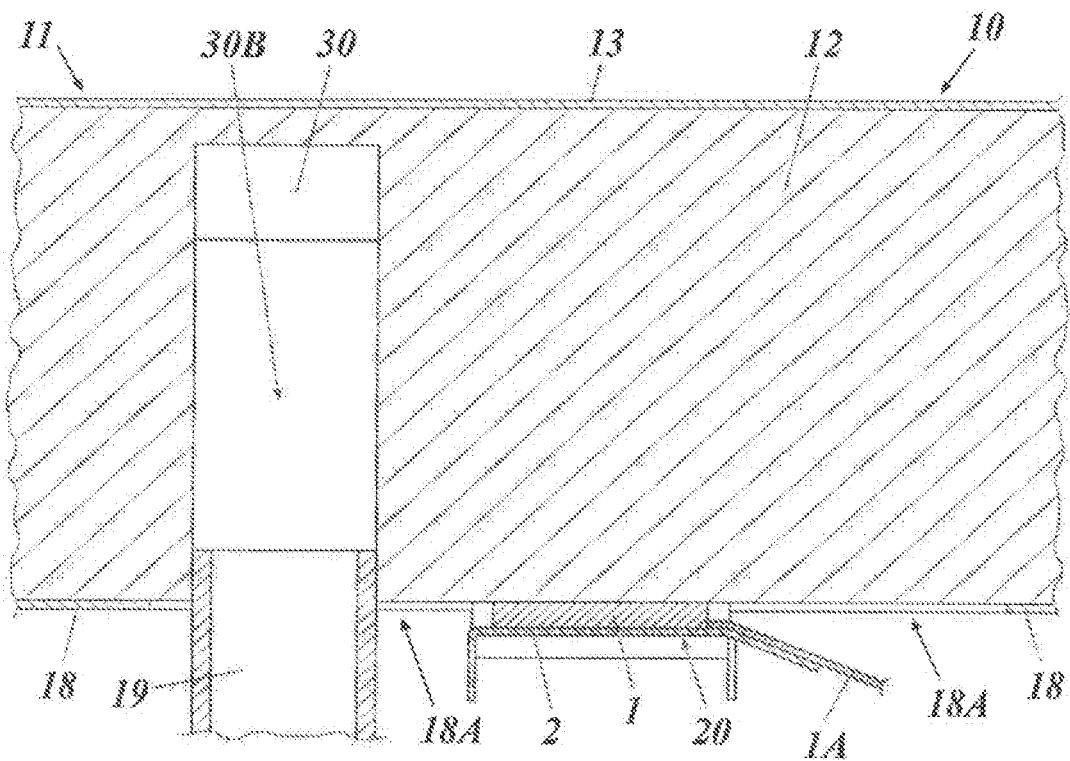

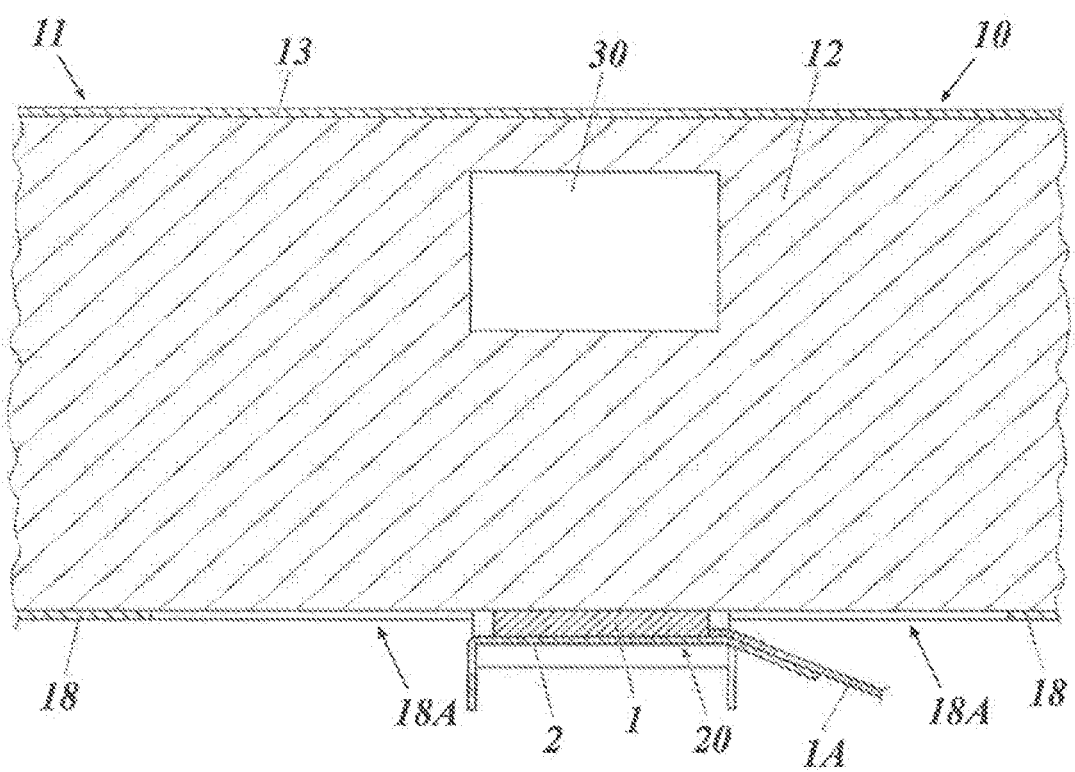

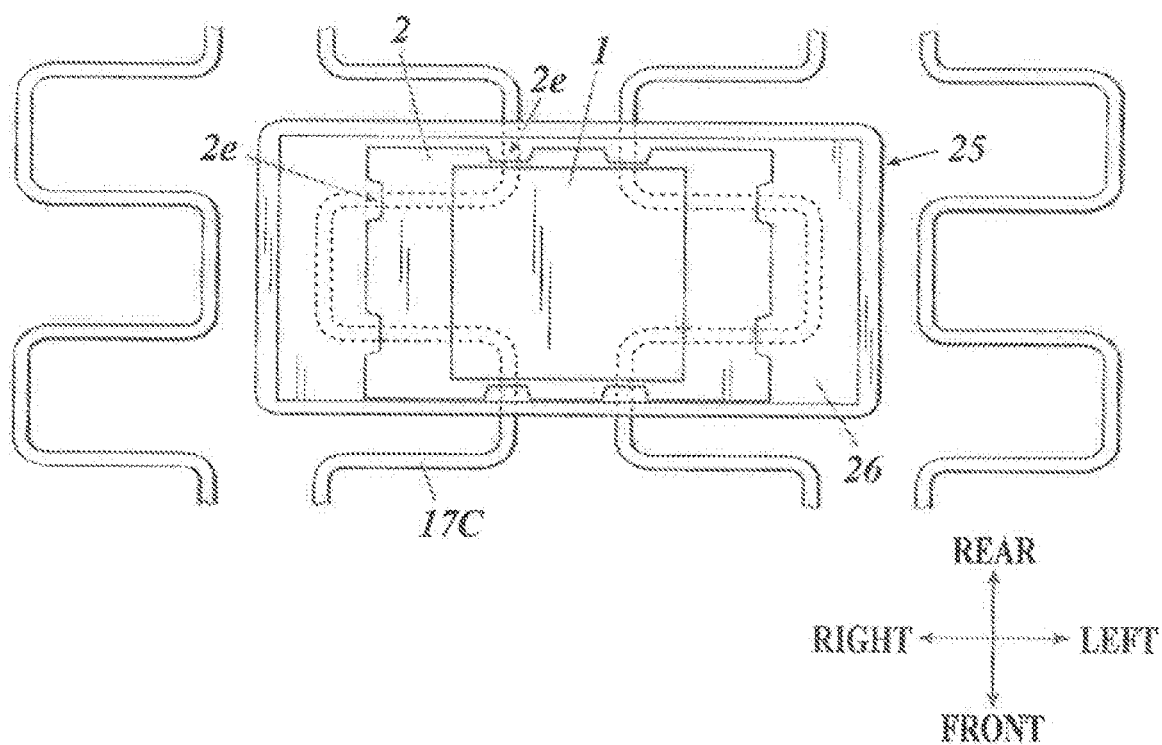

SENSOR DISPOSITION STRUCTURE IN SEAT

CROSS-REFERENCE TO RELATED APPLICATIONS

This is a Continuation of application Ser. No. 17/689,094 filed Mar. 8, 2022 and issued on Apr. 18, 2023 as U.S. Pat. No. 11,628,756, which is a Continuation of application Ser. No. 16/934,114 filed Jul. 21, 2020 and issued on Apr. 12, 2022 as U.S. Pat. No. 11,299,077, which in turn is a Continuation of application Ser. No. 15/855,132 filed Dec. 27, 2017 and issued on Aug. 25, 2020 as U.S. Pat. No. 10,752,144, which in turn claims priority to Japanese Patent Application No. 2017-147693, filed on Jul. 31, 2017, the entire contents of which are incorporated herein by reference.

BACKGROUND OF THE INVENTION

1. Field of the Invention

The present invention relates to a seat disposition structure in a seat.

2. Description of Related Art

There is a case where a sensor such as a position sensor or the like which detects whether a passenger is seated in a seat is disposed in the seat (for example, see JP 2014-100941A).

For example, such sensor is used to detect that a passenger is seated in the seat in the seatbelt reminder technique where the passenger is warned when he/she is not wearing the seatbelt although he/she is sitting in the seat.

Traditionally, when such sensor is to be disposed in a seat, there is a case where the sensor is to be disposed between the cushion pad and the outer cover of the seat cushion of the seat as described in JP 2014-100941A, for example.

However, when a sensor is disposed between a cushion pad and an outer cover, that is, if a sensor is disposed right under an outer cover, the sitting comfort may be unpleasant since the passenger who sits in the seat feels something against his/her buttocks and thighs through the outer cover of the seat.

SUMMARY OF THE INVENTION

The present invention is made in view of the above problem and one of the objects of the present invention is to provide a sensor disposition structure in a seat which can be carried out when disposing a sensor in a seat.

In order to achieve at least one of the objects, according to an aspect of the present invention, there is provided a sensor disposition structure in a seat, including: a cushion pad; and a board-like member which is disposed under the cushion pad, wherein a concave is formed in an upper surface of the board-like member, and a sensor is disposed in the concave.

BRIEF DESCRIPTION OF THE DRAWINGS

The above and other objects, advantages and features of the present invention will become more fully understood from the detailed description given hereinbelow and the appended drawings which are given by of illustration only, and thus are not intended as a definition of the limits of the present invention, and wherein:

FIG. 9 is a view illustrating a state where a bracket-side engaging unit which is formed at the bent unit of the attachment bracket is engaged with the lower surface side of the pan frame (board-like member);

FIG. 10 is a cross-sectional view illustrating a state where the sensor which is disposed in the concave of the pan frame (board-like member) abuts the lower surface of the cushion pad;

FIG. 11 is a cross-sectional view illustrating a state where the sensor is disposed at the position that is directly under the hollow section formed in the cushion pad;

FIG. 13 is a view illustrating a modification example of the board-like member or the like which is set so as to have a wire inserted therein.

DESCRIPTION OF THE PREFERRED EMBODIMENTS

Figure 1:
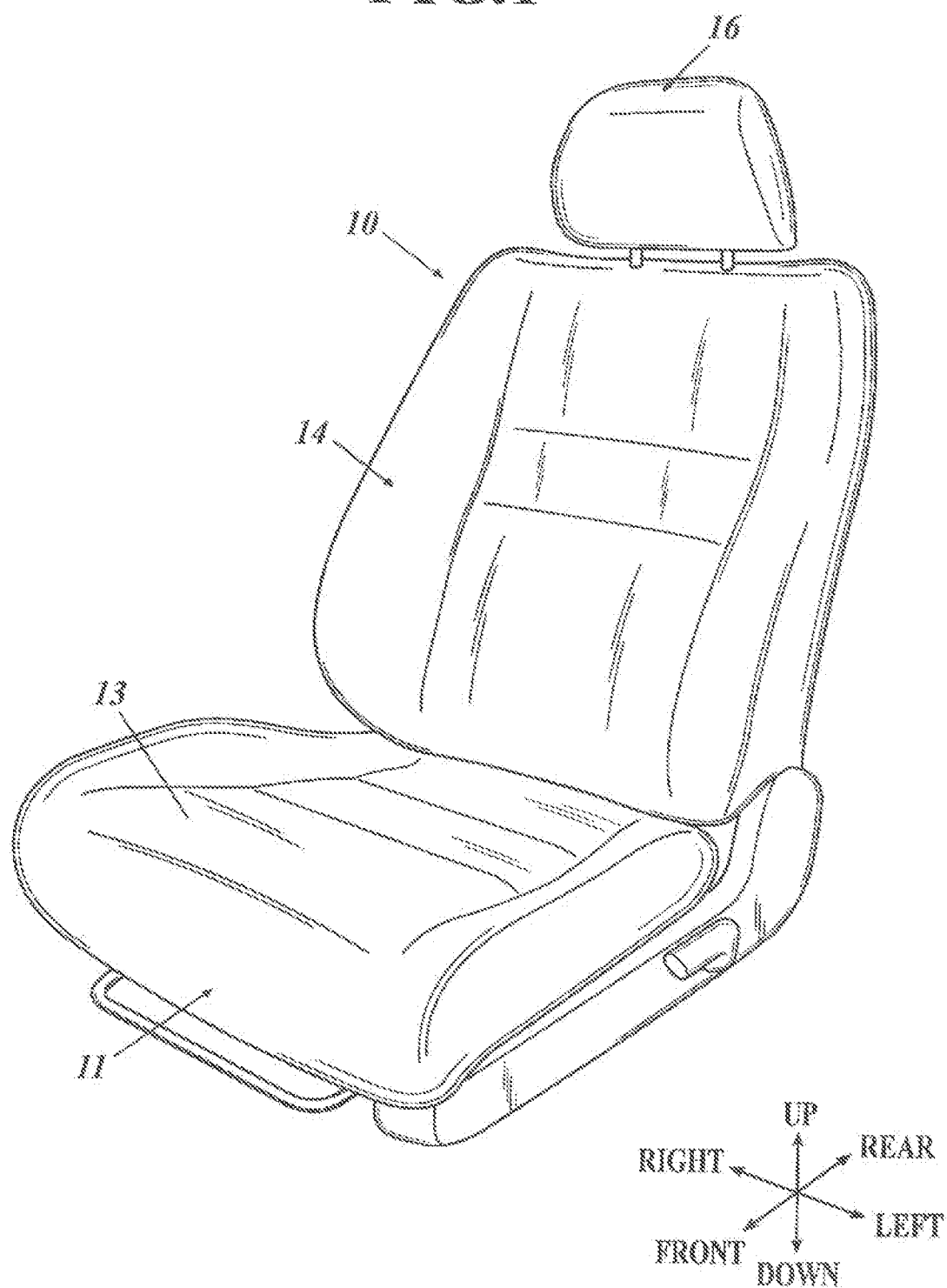
FIG. 1 is a schematic view illustrating a seat.

Hereinafter, embodiments of the present invention will be described with reference to the drawings. However, although various technically preferred limitations for implementing the present invention are included in the following embodiments, the technical scope of the present invention is not limited to the following embodiments and the examples shown in the drawings in any way.

A seat 10 shown in FIG. 1 is placed in a vehicle such as an automobile and the seat 10 is where a passenger such as a driver sits. As shown in FIG. 1, the seat 10 includes a seat cushion 11 which supports the buttocks and thighs of the passenger, a seat back 14 which becomes a backrest, the lower end section thereof being supported by the seat cushion 11, and a headrest 16 which is provided on the seat back 14 and which supports the head of the passenger. Here, auxiliary supporting units such as a neck-rest, armrests, footrests, an ottoman and the like can be included in addition.

Figure 2:
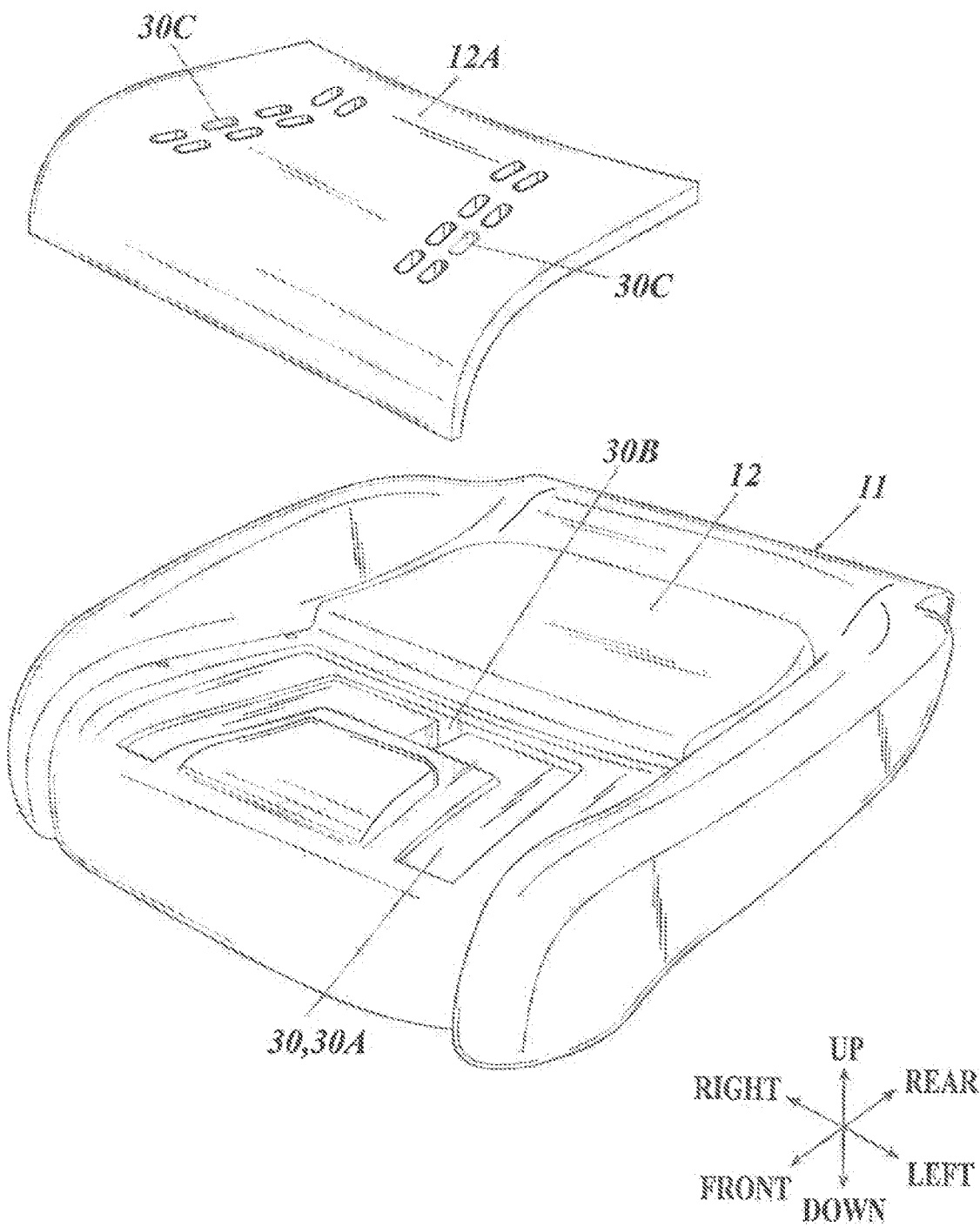
FIG. 2 is a schematic view illustrating an air passage and the like which are formed in a cushion pad of a seat cushion.

As shown in FIG. 2, the seat cushion 11 mainly includes a seat cushion frame 17 (see the after-mentioned FIG. 3) which is the bone structure, a cushion pad 12 which is disposed on the seat cushion frame 17, and an outer cover 13 (omitted in FIG. 2, see FIG. 1) which forms the outer surface of the seat by covering the seat cushion frame 17 and the cushion pad 12.

In the embodiment, an air passage 30 for air (hot air and cold air) is formed in the seat cushion 11 between the cushion pad 12 and the outer cover 13. However, the air passage 30 is not mandatory.

In particular, as shown in FIG. 2, a concave for air passage 30A which forms a part of the air passage 30 is formed in the cushion pad 12. Further, a concave (not shown) which forms the rest or the air passage 30 is formed in the cover member 12A at the position corresponding to the concave for air passage 30A, and the air passage 30 is formed by fitting the cover member 12A in a predetermined section of the cushion pad 12.

Further, a plurality of punching holes are formed in the cover member 12A, and these punching holes are the air vents 30C of the air passage 30. Furthermore, the cushion pad 12 including the cover member 12A is covered with the outer cover 13, at least the section of the outer cover 13 corresponding to the air vents 30C being air permeable.

The air taken in from the blower (not shown) is sent inside the air passage 30 via the through hole 30B, and the air flowed through the air passage 30 is blown out toward the passenger from the air vents 30C of the air passage 30.

Figure 3:
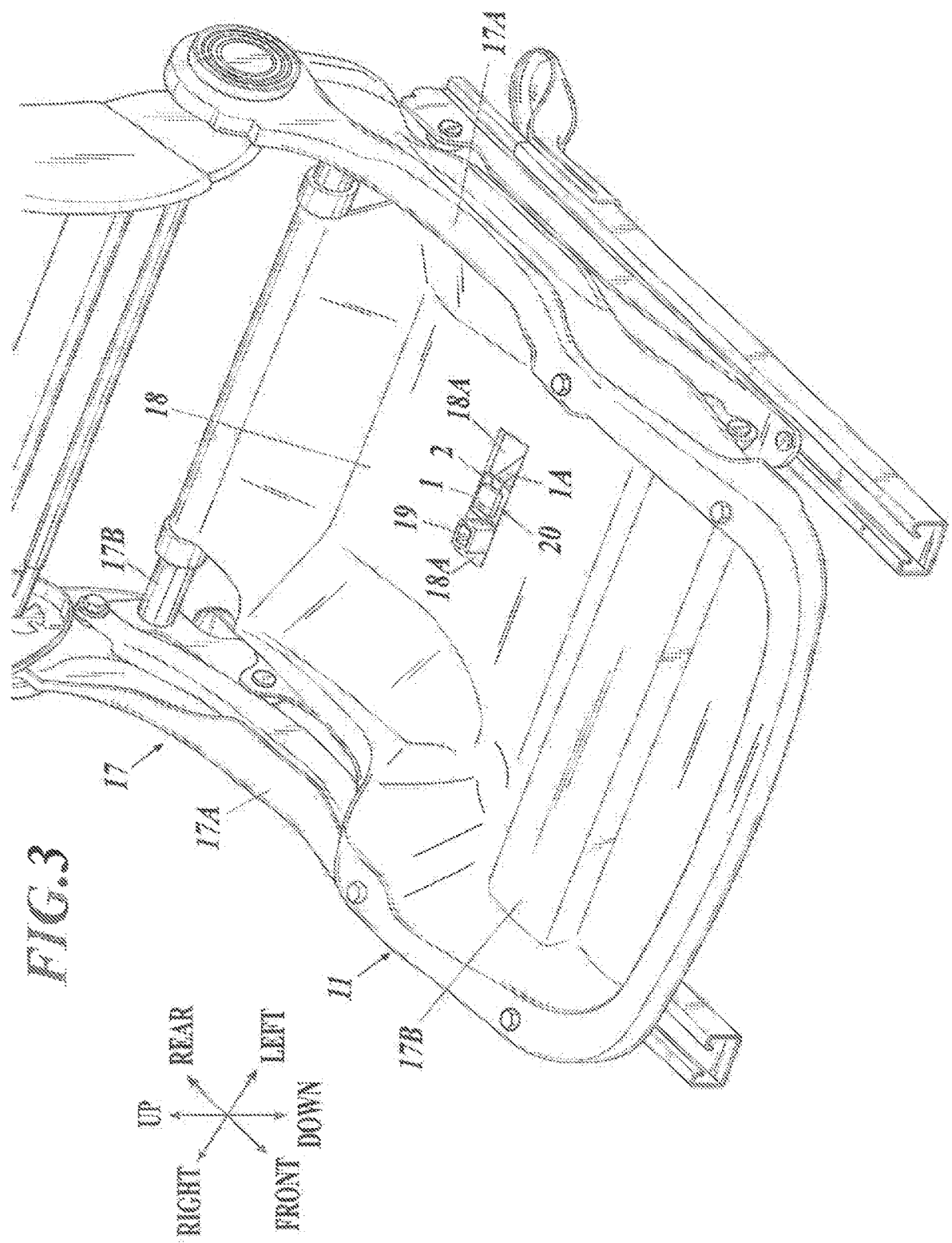
FIG. 3 is a schematic view illustrating a seat cushion frame and a sensor and the like which are disposed in a concave of pan frame (board-like member)

The seat cushion 11 of the embodiment includes the seat cushion frame 17 under the cushion pad 12. As shown in FIG. 3, the seat cushion frame 17 mainly includes side frames 17A which form a left and right pair, connecting members 17B which connect the front end sections and the rear end sections of the side frames 17A (the connecting member 17B for the front end side is disposed under the pan frame 18), and the pan frame 18 which bridges across the side frames 17A and the connecting members 17B.

Here, in the embodiment, a case where the pan frame 18 functions as a board-like member which is disposed under the cushion pad 12 is described. However, a case where the board-like member s configured in a different form other than the pan frame 18 will be described later as a modification example.

The pan frame 18 (board-like member) has a concave 20 formed in the upper surface thereof, and the sensor 1 is disposed inside the concave 20. For example, the sensor 1 can be a position sensor which can detect whether a passenger is seated in the seat 10.

The sensor 1 can be directly attached in the concave 20. However, in the embodiment, the sensor 1 is fixed to an attachment bracket 2 and then, the attachment bracket 2 to which the sensor 1 is fixed is disposed inside the concave 20.

In the case where the sensor 1 is directly attached in the concave 20 of the pan frame 18, the sensor 1 placed in the concave 20 needs to be fix by screwing it thereto and this process can be difficult. However, as described above, by having the configuration where the sensor 1 is fixed to the attachment bracket 2 and then the attachment bracket 2 is attached in the concave 20, the sensor 1 can be easily fixed to the attachment bracket 2 and the attachment bracket 2 can also be easily attached in the concave 20. Therefore, the sensor 1 can be easily disposed in the concave 20.

Further, in the state where the seat 10 is assembled, the cushion pad 12 is disposed on the sensor 1. Then, when a passenger sits in the seat 10, the load of the passenger is applied to the sensor 1 via the cushion pad 12. At this time, if the sensor 1 is directly attached in the concave 20 of the pan frame 18, the entire load will be applied to the sensor 1 and the sensor 1 may be influenced in a bad way. However, if the sensor 1 is attached in the concave 20 via the attachment bracket 2 as described above, a part of the load of the passenger will be absorbed by the attachment bracket 2 when the load of the passenger is applied to the sensor 1.

Therefore, comparing to the case where the sensor 1 is directly attached in the concave 20, the influence of the load of the passenger on the sensor 1 is reduced.

Figure 4:
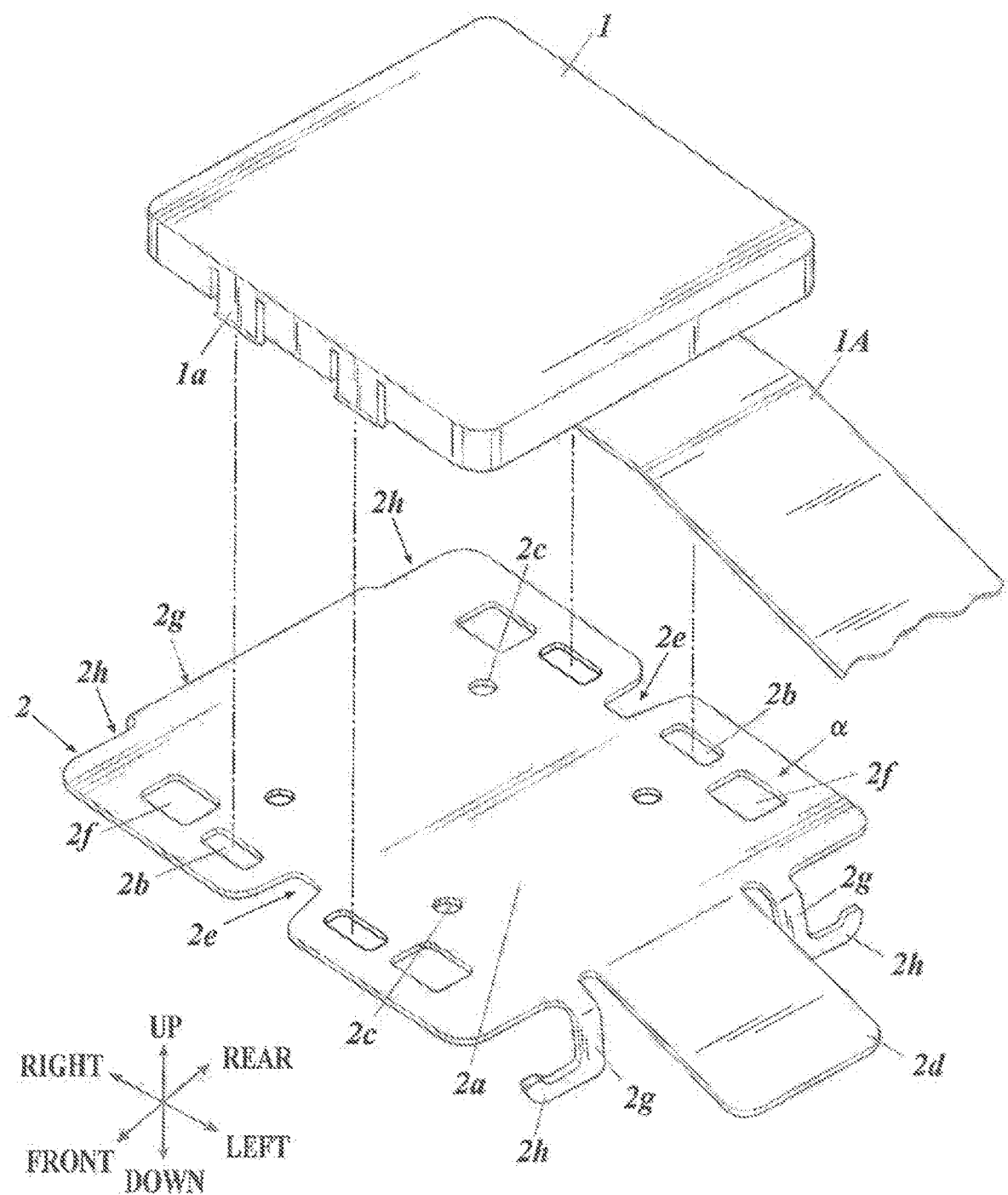
FIG. 4 is a schematic view illustrating a sensor and an attachment bracket.
Figure 5:
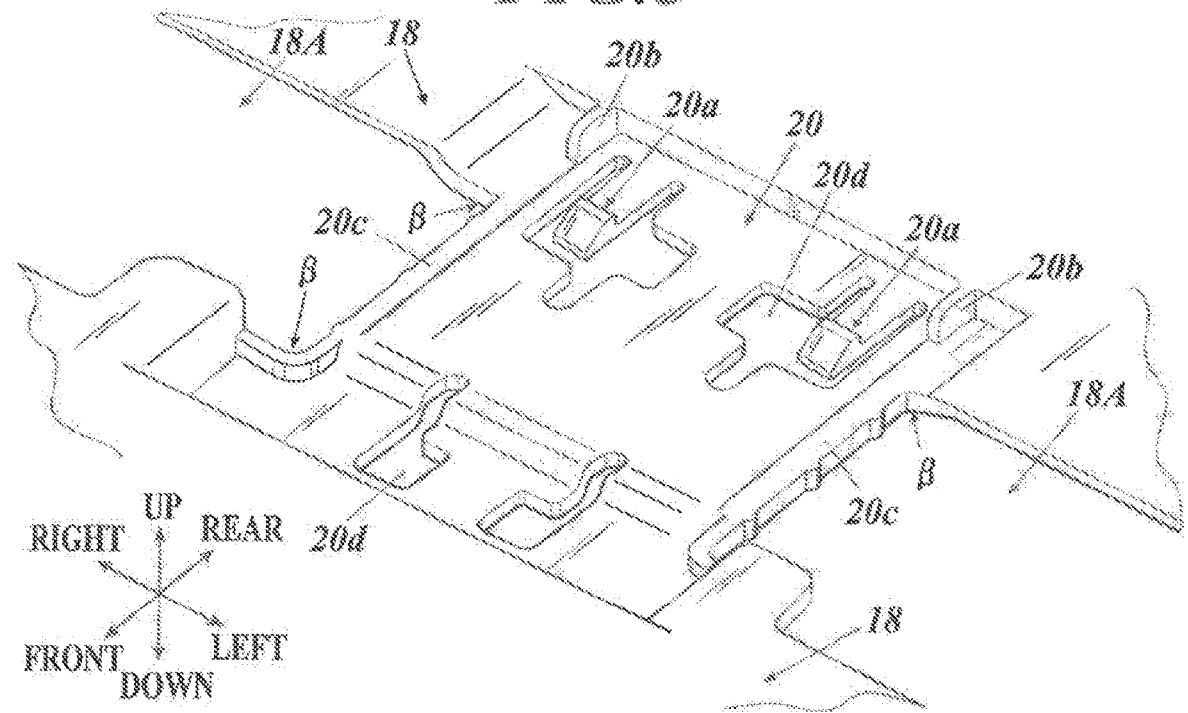
FIG. 5 is an enlarged view illustrating the concave and the like which are formed in the pan frame (board-like member)

Hereinafter, the configuration and the like of the concave 20 and the attachment bracket 2 will be described in detail. FIG. 4 is a schematic view illustrating the sensor 1 and the attachment bracket 2, and FIG. 5 is an enlarged view illustrating the concave 20 and the like formed in the pan frame 18 (board-like member).

In the plate-like main body unit 2a of the attachment bracket 2, engaging holes 2b with which the engaging units 1a of the sensor 1 engage are formed and holes 2c in which the screw units 1b (not shown in FIG. 4, see the aftermentioned FIG. 7) of the sensor 1 are to be inserted are formed. By inserting the engaging units 1a of the sensor 1 in the engaging holes 2b of the attachment bracket 2 and the engaging units 1a respectively engaging with the engaging holes 2b, and in this state, by further screwing on the screw units 1b which are inserted in the holes 2c of the attachment bracket 2 from the back side (that is, the lower side) of the attachment bracket 2, the sensor 1 can be easily attached to the attachment bracket 2.

A harness 1A which electrically connects the sensor 1 and external devices (not shown in the drawing, a power device, a device which processes the signals from the sensor 1 and the like) is connected to the sensor 1, and the attachment bracket 2 includes a guide unit 2d for the harness 1A. Since the guide unit 2d gradually inclines downward with respect to the main body unit 2a of the attachment bracket 2, the harness 1A is guided by the guide unit 2d to be in a state where it gradually inclines downward.

If the attachment bracket 2 does not have the guide unit 2d, the harness 1A will hang down by its own weight at the part where the harness 1A and the sensor 1 are connected. In such state, when the vehicle shakes (e.g. shakes in a vibrating manner) and the seat 10 moves (e.g. moves in a vibrating manner) along with the vehicle shaking, the harness 1A will move (e.g. moves in a vibrating manner) relatively in a large movement respect to the sensor 1. Therefore, the harness 1A can be easily damaged or can be easily cut off. With respect to the above, by supporting the harness 1A by the guide unit 2d of the attachment bracket 2 as described above, the harness 1A being in the state where it gradually inclines downward, the harness 1A which is supported by the guide unit 2d will not easily move relatively with respect to the sensor 1 even when the seat 10 moves. Therefore, the harness 1A will not be easily damaged nor easily cut off.

Further, the main body unit 2a of the attachment bracket 2 has cutouts 2e formed at the outer circumference section thereof.

Due to the attachment bracket 2 having the cutouts 2e at the outer circumference thereof, even in the case where the sensor 1 and the attachment bracket 2 are in the state of receiving the load as described above and a force which can deform the main body unit 2a of the attachment bracket 2 is applied thereto, the cutouts 2e absorb the deformation of the main body unit 2a of the attachment bracket 2. Therefore, the deformation of the main body unit 2a of the attachment bracket 2 can easily return to the original state when the force is not applied to the attachment bracket 2 any more, and the attachment bracket 2 will not remain to be in the deformed state.

On the other hand, the concave 20 of the pan frame 18 has an engaging unit for attaching the attachment bracket 2 in the concave 20 by engaging with the attachment bracket 2 formed thereto.

Figure 6:
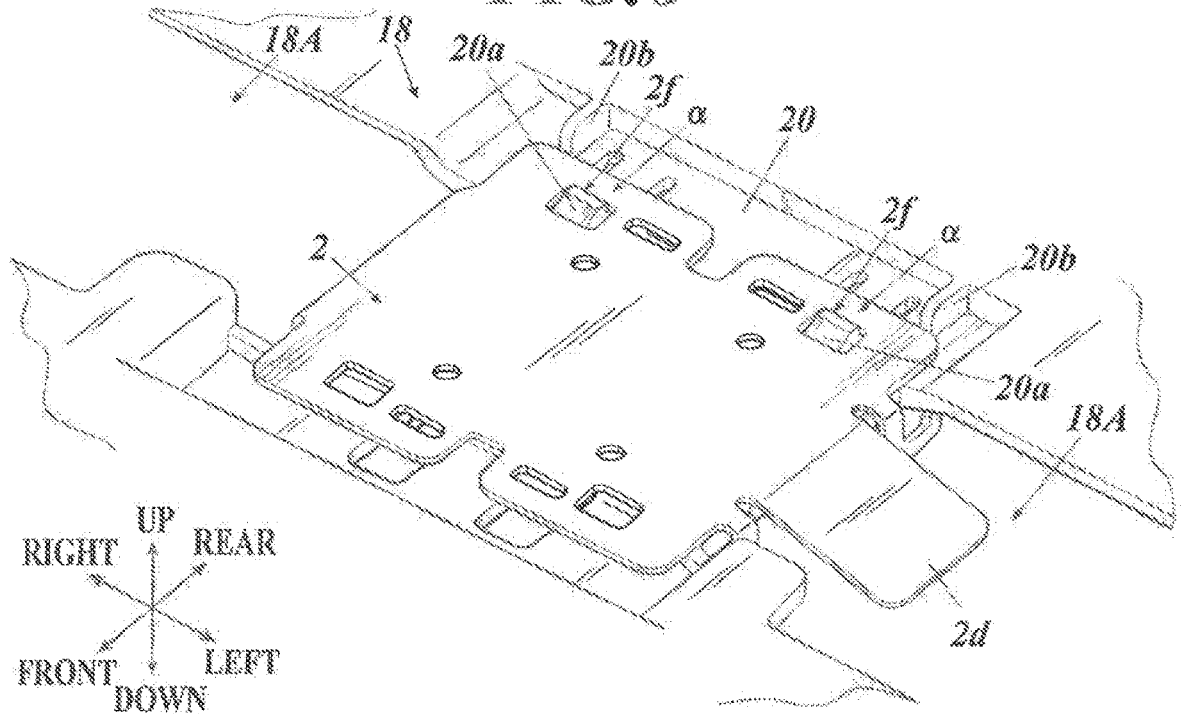
FIG. 6 is a schematic view illustrating a state where the attachment bracket is attached in the concave.

In particular, as shown in FIG. 5, nail units 20a are formed as the engaging unit on the upper surface of the concave 20 so as to protrude, the nail units 20a being formed in the shape of nail. Further, the main body unit 2a of the attachment bracket 2 has engaging holes 2f which engage with the nail units 20a formed therein. When the attachment bracket 2 to which the sensor 1 is attached is to be attached in the concave 20, as shown in FIG. 6, the nail units 20a of the concave 20 and the engaging holes 2f of the attachment bracket 2 will engage with each other. Here, in FIG. 6, the sensor 1 and the harness 1A are omitted so that the engagement of the nails 20a and the engaging holes 2f can be seen clearly.

As described above, although this can also be said for the after-mentioned second engaging units 20b and the like, the attachment bracket 2 can be easily attached in the concave 20 in the embodiment since the attachment bracket 2 can be attached in the concave 20 just by making the attachment bracket 2 (engaging holes 2f) engage with the engaging unit (nail units 20a) formed in the concave 20.

Further, due to the attachment bracket 2 being attached in the concave 20 in the state where the nail units 20a of the concave 20 and the engaging holes 2f of the attachment bracket 2 engaging with each other, mainly the positioning of the attachment bracket 2 in the front and rear directions can be carried out accurately due to the nail units 20a. Furthermore, the nail units 20a can contribute to the positioning of the attachment bracket 2 in the right and left directions. Moreover, when the attachment bracket 2 is to be attached to the concave 20, by confirming that the hail units 20a protrude upward from the engaging holes 2f of the attachment bracket 2, whether the engaging holes 2f of the attachment bracket 2 and the nail units 20a are engaged with each other in an appropriate way and whether the attachment bracket 2 is disposed at an appropriate position in the concave can be confirmed.

Here, the case where the sensor 1 is disposed in the concave 20 in the state where the harness 1A extends to the left side of the sensor 1 is shown in FIGS. 3 to 5. However, there may be a case where the sensor 1 is disposed in the concave 20 in the state where the harness 1A extends to the right side of the sensor 1. Further, the nail units 20a are only formed in the rear side section of the concave 20 in the embodiment as shown in FIG. 5. However, since the direction of the harness 1A, that is the direction of the guide unit 2d, may be in the left direction or in the right direction, therefore, the engaging holes 2f of the attachment bracket 2 are formed not only in the rear side section but also in the front side section as in the state shown in FIG. 4.

Further, as shown in FIG. 5, the second engaging units 20b are formed near the nail units 20a on the upper surface of the concave 20. When the attachment bracket 2 is attached in the concave 20, as shown in FIG. 6, the edge sections α of the engaging holes 2f of the attachment bracket 2 are fit in between the nail units 20a and the second engaging units 20b.

In such way, when the attachment bracket 2 to which the sensor 1 is attached is attached in the concave 20 of the pan frame 18, the positioning of the attachment bracket 2 in the front and rear directions can be carried out more accurately due to the edge sections α of the engaging holes 2f of the attachment bracket 2 being fit in between the nail units 20a and the second engaging units 20b of the concave 20. Further, the attachment bracket 2 will not be easily displaced in the front and rear directions.

Furthermore, in the embodiment, the left and right edge sections of the concave 20 are formed so as to be slightly higher than the upper surface of the concave 20 as shown in FIG. 5, and these sections are the ribs 20c which respectively support the two edge sections (in the embodiment, the left and right sections) of the main body unit 2a of the attachment bracket 2 (see FIG. 6).

By having the ribs 20c in the way as described above, the part of the main body unit 2a of the attachment bracket 2 other than the parts supported by the ribs 20c will be slightly in the air, floating above the upper surface of the concave 20. Therefore, as described above, the attachment bracket 2 can readily absorb a part of the load when the load of the passenger is applied to the sensor 1. Moreover, since the rigidity of the concave 20 itself can be improved by having the ribs 20c comparing to the case, without the ribs 20c, the concave 20 will not break easily when a passenger sits in the seat 1 and the load of the passenger is applied to the pan frame 18, bending the pan frame 18.

Here, for example, the rigidity of the concave 20 can be improved by further forming a rib on the under surface of the concave 20.

Figure 7:
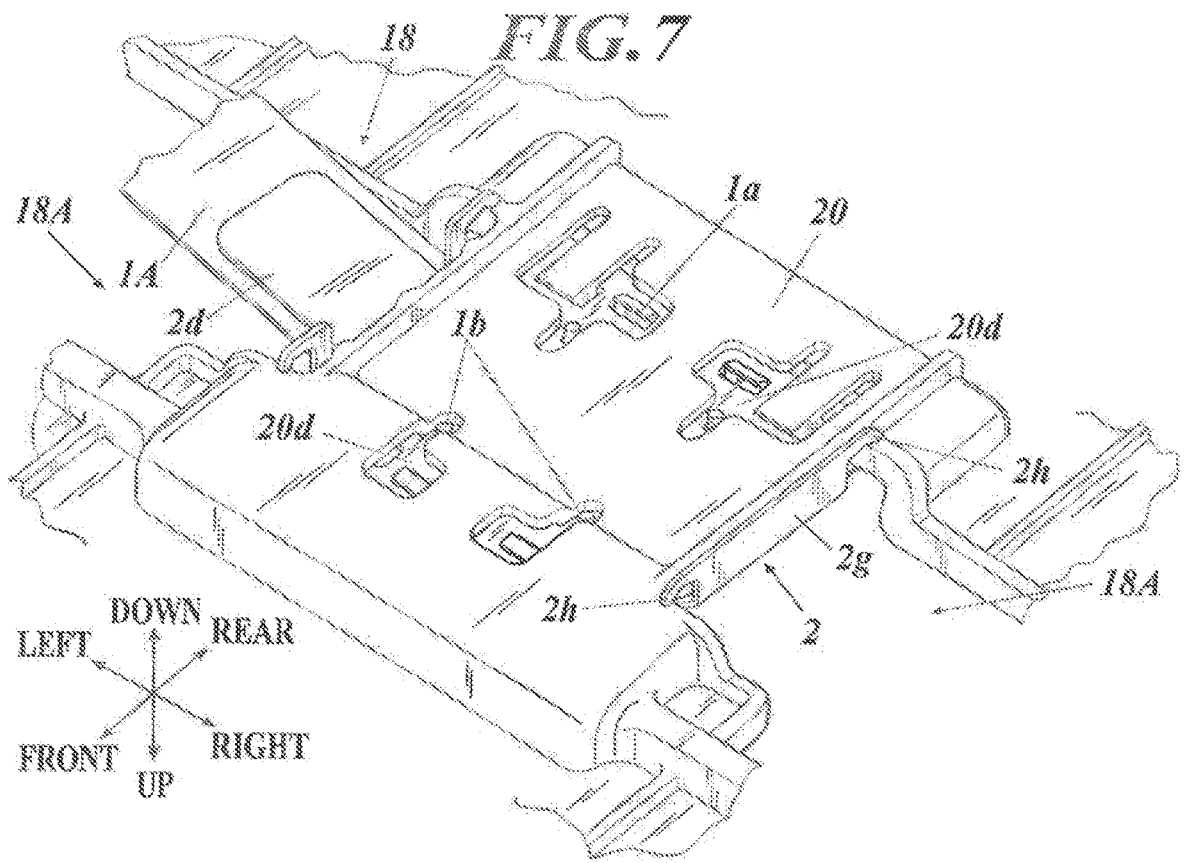
FIG. 7 is a schematic view illustrating a state where the state shown in FIG. 8 is seen from the back side of the pan frame (board-like member)

Further, escape units 20d are formed in the concave 20 as openings, and the escape units 20d are formed so that the engagement units 1a, the screen units 1b and the like of the sensor 1 which protrude downward from the under surface of the attachment bracket 2 can be positioned in the escape units 20d as shown in FIG. 7 when the attachment bracket 2 is attached to the concave 20. In the embodiment, by having such configuration, the engagement units 1a, the screw units 1b and the like of the sensor 1 which protrude downward from the under surface of the attachment bracket 2 will not interfere with the concave 20 when the attachment bracket 2 is attached in the concave 20.

In the embodiment, the attachment bracket 2 also has a structure for engaging with the concave 20 of the pan frame 18. In particular, the attachment bracket 2 includes bent units 2g which are respectively bent downward at the left and right edge sections of the main body unit 2a as shown in FIG. 4. Here, in the state shown in FIG. 4, the left side bent unit 2g of the attachment bracket 2 is divided in two, one in the front side and the other in the rear side, because the guide unit 2d is formed between the two divided parts of the bent unit 2g, and the right side bent unit 2g of the attachment bracket 2 is formed as one plate-like unit (see FIG. 7 and the after-mentioned FIG. 9).

When the attachment bracket 2 is to be attached in the concave 20, the ribs 20c of the concave 20 will be tightly fit between the bent units 2g (see FIG. 5) on the left and right sides. In such way, mainly the positioning of the attachment bracket 2 can be carried out accurately due to the bent units 2g, and the attachment bracket 2 will not be easily displaced in the left and right directions. Further, by bending the attachment bracket to form the bent units 2g, the rigidity of the attachment bracket 2 itself can be improved.

Further, the bent units 2g of the attachment bracket 2 have bracket-side engaging units 2h formed thereto so as to protrude in the front direction from the front end sections of the bent units 2g and protrude in the rear direction from the rear end sections of the bent units 2g.

Furthermore, as shown in FIG. 9, when the attachment bracket 2 is attached in the concave 20 of the pan frame 18, the bracket-side engaging units 2h of the attachment bracket 2 engage with the under surface of the pan frame 18 (see β in FIG. 9, Rs in the drawing how the ribs formed on the under surface of the pan frame 18). By having such configuration, mainly the positioning of the attachment bracket 2 in the upward and downward directions can be carried out accurately due to the bracket-side engaging units 2h, and the attachment bracket 2 will not be easily displaced in the upward and downward directions.

Figure 8:
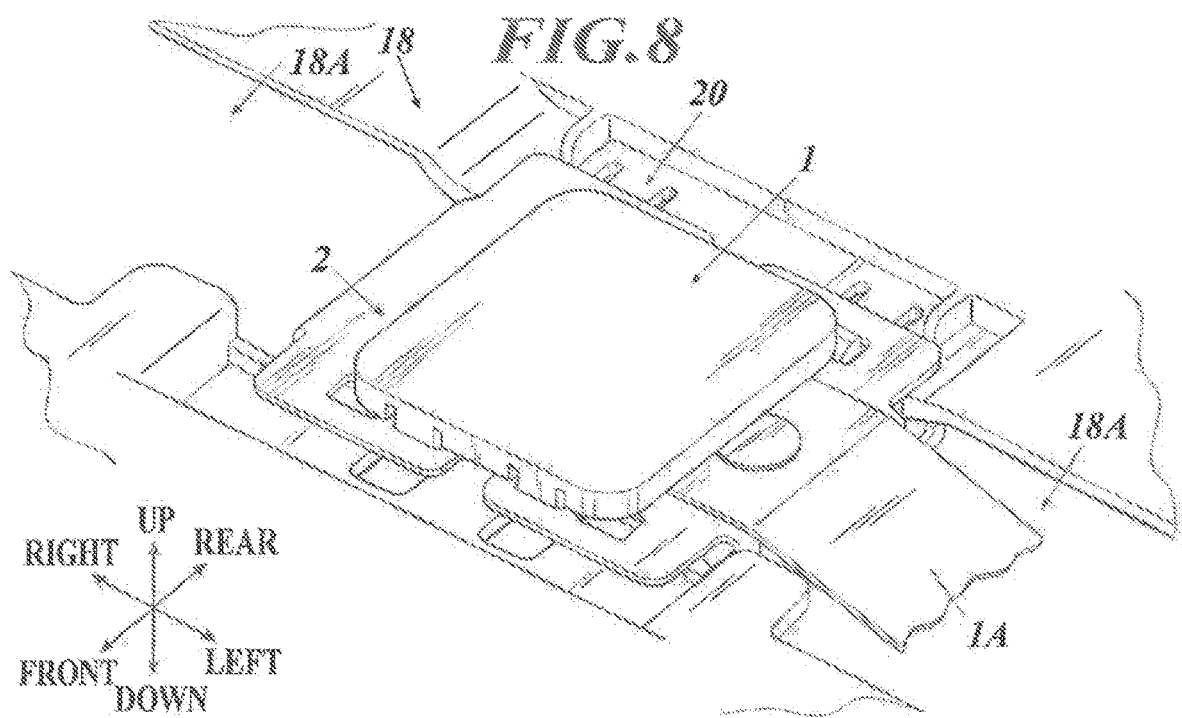
FIG. 8 is a schematic view illustrating a state where the attachment bracket to which the sensor and the like are attached is attached in the concave.

In the embodiment, as described above, ray attaching the attachment bracket 2 to which the sensor 1 is attached in the concave 20 of the pan frame 18, the sensor 1 can be accurately and firmly attached in the concave 20 of the pan frame 18 via the attachment bracket 2 as shown in FIG. 8.

On the other hand, in the case where the openings 18A are formed in the pan frame 18 as shown in FIGS. 3 and 5, the harness 1A can be guided so as to go under the seat 10 by inserting the harness 1A in an opening 18A.

Here, the opening 18A for inserting the harness 1A can be newly formed in the pan frame 18. Hereinafter, although a description will be given on the basis of FIGS. 3, 5 and other drawings, the present invention is not limited to the case where two openings 18A are formed as shown in FIG. 3 and other drawings, and there may be one opening 18A or there may be three or more openings 18A.

Further, there is no need to form the openings 18A on the left and right sides of the concave 20 as shown in FIG. 3 and other drawings and the openings 18A may be formed on the front and rear sides or the like of the concave 20. Furthermore, the openings 18A may be cutouts (that is, formed in the shapes that are cut out inward from the end sections of the pan frame 18), and the openings 18A are not limited to the holes as shown in FIG. 3 and other drawings. Further, the openings 18A (do not need to be the opening for the duct 19 which will be described hereinafter.

In the seat 10 of the embodiment, as shown in FIG. 2, the air passage 30 is formed between the cushion pad 12 and the outer cover 13 of the seat cushion 11. The air sent in from the blower (not shown) which is provided under the pan frame 18 is sent into the air passage 30 through the through hole 30B, and the air flowed through the air passage 30 is blown out toward the passenger from the air vents 30C of the air passage 30. Further, an opening 18A is formed as a through hole in which a duct 19 (see FIG. 10) for supplying the air to the through hole 30B from the blower can be inserted.

Therefore, by using the opening 18A as the opening for inserting the harness 1A of the sensor 1, the opening 18A for duct which is already formed can be utilized without newly forming an opening 18A in the pan frame 18 and the harness 1A can be inserted in the opening 18A.

Moreover, the blower is provided under the pan frame 18 and usually, is provided either on the left or right side of the seat 10. Therefore, the position in the pan frame 18 where the duct 19 penetrates is also more to the left or right with respect to the center corresponding to the position of the blower. In view of this, in the seat 10 of the embodiment, a total of two openings 18A in which the duct 19 can be inserted are formed, one on the left side and the other on the right side with respect to the center of the pan frame 18 as shown in FIGS. 3 and 5 so as to accommodate both cases.

Further, in the embodiment, the section between the two openings 18A is a concave and the above described concave 20 of the pan frame 18 is formed in this section.

In the embodiment, the openings 18A are formed continuously from the concave 20 of the pan frame 18 in such way. That is, the above described concave 20 in which the sensor 1 and the attachment bracket 2 are to be disposed is formed at the section between the plurality of openings 18A which are formed near each other (the section between the plurality of openings 18A that bridges across the front section and the rear section of the pan frame 18).

In general, if the plurality of openings 18A are formed near each other, the rigidity of the section between them becomes weak and the section can easily deform. However, in the embodiment since the rigidity of the concave 20 itself is improved by having the ribs 20C formed in the concave 20 which is formed in this section as described above, such deformation will not occur easily.

Further, since the harness 1A of the sensor 1 which is attached in the concave 20 of the pan frame 18 via the attachment bracket 2 is inserted in an opening 18A which is formed continuously from the concave 20, the harness 1A can be easily routed compared to the case where there is a distance between the concave 20 and the opening 18A. Furthermore, if there is a distance between the concave 20 and the opening 18A, the harness 1A will be sandwiched between the pan frame 18 and the cushion pad 12 (see FIG. 2 and the after-mentioned. FIG. 10) and there is a possibility that the harness 1A is damaged due to the harness 1A and the pan frame 18 or the harness 1A and the cushion pad 12 rubbing against each other. However, if the concave 20 and the opening 18A are formed continuously as in the embodiment, the rubbing as described above will not easily occur and the harness 1A will not be easily damaged nor cut off.

Further, the duct 19 will be inserted in any one opening 18A of the plurality of openings 18A as shown in FIG. 3. Therefore, by inserting the harness 1A in the opening 18A in which the duct 19 is not inserted, the harness 1A and the duct 19 will not interfere with each other and the harness 1A and the duct 19 will not rub against each other. Thus, the harness 1A will not be easily damaged nor cut off.

Here, the configuration may be such that the harness 1A is inserted in the opening 18A in which the duct 19 is inserted.

In the embodiment, the duct 19 is inserted in the opening 18A of the pan frame 18 and is inserted in the through hole 30B which is formed in the cushion pad 12 from below as shown in FIG. 10. Since the cushion pad 12 will not be raised due to the duct 19 being inserted in the through hole 30B, the state where the upper surface of the sensor 1 abutting the under surface of the cushion pad 12 will be maintained.

Further, when a passenger sits in the seat 10, the load is applied to the cushion pad 12 from above, the cushion pad 12 is compressed and the pressure applied to the sensor 1 from the cushion pad 12 increases. Therefore, the sensor 1 can reliably detect the load when a passenger sits in the seat 10.

Here, in FIG. 10, there is shown a configuration where the upper surface of the pan frame 18 and the upper surface of the sensor 1 are in flash and where the cushion pad 12 whose bottom is flat is place on the pan frame 18 and the sensor 1. However, the configuration may be such that the sensor 1 is disposed so that the upper surface of the sensor 1 be higher than the upper surface of the pan frame 18 and that a concave is formed in the section of the cushion pad 12 corresponding to the sensor 1.

Moreover, if the concave 20 of the pan frame 18 is formed at the position right under a hollow section such as the air passage 30 or the like formed in the cushion pad 12 as shown in FIG. 11, the section of the cushion pad 12 above the hollow section will deform downward and absorbs the load when a passenger sits in the seat 10, and the load will not be transmitted to the section below the hollow section. Therefore, the pressure applied to the sensor 1 will not increase sufficiently and it may be difficult to detect that a passenger has sat in the seat 10 by the sensor 1.

Therefore, it is preferred that the concave 20 in which the sensor 1 is disposed is formed at a position other than the position right below the hollow section such as the air passage 30 or the like which is formed in the cushion pad 12. By having such configuration, the load applied to the cushion pad 12 will be directly applied to the sensor 1 when a passenger sits in the seat 10. Therefore, the pressure which is applied to the sensor 1 can increase appropriately and whether a passenger has sat in the seat 10 can be easily detected.

As described above, according to the disposition structure of the sensor 1 in the seat 10 of the embodiment, the sensor 1 is disposed in the concave 20 which is formed in the upper surface of the board-like member (pan frame 18) which is disposed under the cushion pad 12 (see FIG. 10).

In the traditional disposition structure of a sensor in a seat, as described above, the sensor 1 is disposed between the cushion pad 12 and the outer cover 13 (that is, just under the outer cover). Therefore, the passenger who sat in the seat 10 can feel something against their buttocks or thighs through the outer cover 13 of the seat 10 and the sitting comfort may be unpleasant.

However, in the disposition structure of the sensor 1 in the seat 10 according to the embodiment, since the cushion pad 12 is placed between the buttocks and thighs of the passenger and the sensor 1 as described above, the passenger who is sitting in the seat 10 will not feel the sensor 1 against their buttocks and thighs and the sitting conform of the passenger can improve comparing to the traditional case.

Further, if the sensor 1 is simply disposed on the upper surface of the board-like member (pan frame 18), the cushion pad 12 will be raised for the height of the sensor 1, and this can cause discomfort in the passenger who is setting and the sitting comfort may be unpleasant. However, according to the disposition structure of the sensor 1 in the seat 10 of the embodiment, since the concave 20 is formed in the upper surface of the board-like member (pan frame 18) and the sensor 1 is disposed therein as described above, such discomfort as described above can be avoided and the sitting comfort can be improved.

Further, the sensor 1 is disposed in the concave 20 in a state being fixed to the attachment bracket 2. Therefore, the sensor 1 can be easily disposed in the concave 20 since the attachment bracket 2 is attached in the concave 20 after the sensor 1 is fixed to the attachment bracket 2. Further, when the passenger sits in the seat 10 and the load of the passenger is applied to the sensor 1 via the cushion pad 12, a part of the load will be absorbed by the attachment bracket 2. Thus, comparing to the case where the sensor 1 is directly attached in the concave 20, the influence of the load of the passenger on the sensor 1 becomes small.

Furthermore, the attachment bracket 2 is attached in the concave 20 in a state being engaged with the engaging unit formed in the concave 20. Therefore, the attachment bracket 2 can be easily attached in the concave 20. In addition, the positioning of the attachment bracket 2 can be carried out easily due to the engaging unit, and the attachment bracket 2 will not be easily displaced in the front and rear directions, in the left and right directions and the like.

Further, the nail unit 20a which is formed in a nail shape is formed on the upper surface of the concave 20 as the engaging unit. The nail unit 20a protrudes from the upper surface of the concave 20. Therefore, mainly the positioning of the attachment bracket 2 in the front and rear directions can be carried out accurately. Further, by confirming that the nail unit 20a protrudes upward from the engaging hole 2f of the attachment bracket 2 when attaching the attachment bracket 2 in the concave 20, whether the attachment bracket 2 and the nail unit 20a are engaged properly and whether the attachment bracket 2 is disposed at the appropriate position in the concave 20 can be easily confirmed.

Furthermore, the second engaging unit 20b is formed on the upper surface of the concave 20 at a position near the nail unit 20a. Therefore, when attaching the attachment bracket 2 in the concave 20, the edge section α of the engaging hole 2f of the attachment bracket 2 will be tightly fit between the nail unit 20a and the second engaging unit 20b. Thus, the positioning of the attachment bracket 2 in the front and rear directions can be carried out more accurately and the attachment bracket 2 will not be easily displaced in the front and rear directions.

Further, an opening 18A is formed in the pan frame 18 functions as the board-like member, the attachment bracket 2 includes the bent unit 2g which is bent at a position corresponding to the opening 18A, and the attachment bracket 2 includes the bracket-side engaging unit 2h which protrudes from an edge section of the bent unit 2g and which engages with the under surface of t the pan frame 18. Therefore, mainly the positioning of the attachment bracket 2 in the left and right directions can be carried out accurately due to the bent unit, and the attachment bracket 2 will not be easily displaced in the left and right directions. In addition, the rigidity of the attachment bracket 2 itself can be improved. Furthermore, since the attachment bracket 2 includes the bracket-side engaging unit 2h, mainly the positioning of the attachment bracket 2 in the up and down directions can be carried out accurately due to the bracket-side engaging unit 2h, and the attachment bracket 2 will not be easily displaced in the up and down directions.

Furthermore, the attachment bracket 2 is attached in the concave by the bracket-side engaging unit 2h engaging with the under surface of the pan frame 18 and by the attachment bracket 2 engaging with the nail unit 20a which is formed on the upper surface of the concave 20 so as to protrude therefrom. Therefore, the positioning of the attachment bracket 2 can be carried out more accurately and the attachment bracket 2 will not be easily displaced in the front and rear directions, the up and down directions and the like.

Further, ribs 20c which respectively support the two end sections of the attachment bracket 2 are formed on the upper surface of the concave 20. Therefore, since the main body unit 2a of the attachment bracket 2 will be in a state slightly floating in the concave 20 with respect to the part other than the rib parts, the attachment bracket 2 can readily absorb a part of the load when the load of the passenger is applied to the sensor 1. Further, since the rigidity of the concave 20 itself can be improved by having the ribs 20c, the concave 20 will not be easily damaged.

Furthermore, the attachment bracket 2 includes the guide unit 2d for the harness 1A which electrically connects the sensor 1 and an external device, and the guide unit 2d inclines downward. Therefore, the harness 1A will be supported by the guide unit 2d from below in the state where the harness 1A gradually inclines downward by being guided by the guide unit 2d. Thus, the harness 1A which is supported by the guide unit 2d will not easily move with respect to the sensor 1 even when the seat 10 moves, and the harness 1A will not be easily damaged nor cut off.

Further, the attachment bracket includes the cutout 2e at an outer circumference section thereof. Therefore, even in the case where the load is applied to the sensor 1 and the attachment bracket 2 and the force that can deform the attachment bracket 2 is applied, the cutout 2e will absorb the deformation of the attachment bracket 2. Thus, the deformation of the attachment bracket 2 can easily return to the original state when the force is not applied to the attachment bracket 2 any more, and the attachment bracket 2 will not remain to be in the deformed state.

Furthermore, the opening 18A is formed in the pan frame 18 continuously from the concave 20, and the harness 1A which electrically connects the sensor 1 and an external device is inserted in the opening 18A. Therefore, the harness 1A can be easily routed comparing to the case where there is a distance between the concave 20 and the opening 18A. In addition, if there is a distance between the concave 20 and the opening 18A, the harness 1A will be placed between the pan frame 18 and the cushion pad 12, and there is a possibility that the harness 1A will be damaged or cut off due to the harness 1A rubbing against the pan frame 18 and the cushion pad 12. However, if the concave 20 and the opening 18A are formed continuously, such rubbing against each other will not easily occur and the harness 1A will not be easily damaged nor cut off.

Further, the duct 19 for supplying air to the air passage 30 which is formed in the cushion pad 12 can be inserted in the opening 18A. Therefore, the opening 18A for the duct 19 which is already formed can be utilized and the harness 1A can be inserted in the opening 18A without forming a new opening in the pan frame 18.

Furthermore, a plurality of openings 18A are formed in the pan frame 18, and the harness 1A is inserted in the opening in which the duct 19 is not inserted. Therefore, the harness 1A and the duct do not interfere with each other and the harness 1A and the duct 19 do not rub against each other. Thus, the harness 1A will not be easily damaged nor cut off.

Further, the concave 20 in which the sensor 1 is disposed is formed at a position avoiding a position right under the hollow section (e.g. the air passage 30) formed in the cushion pad 12. Therefore, the load which is applied to the cushion pad 12 when the passenger sits in the seat 10 is directly applied to the sensor 1 without being absorbed by the hollow section formed in the cushion pad 12. Thus, the pressure applied to the sensor 1 can be increased accurately, and it will be easy to detect that the passenger has sat in the seat 10 by the sensor 1.

MODIFICATION EXAMPLE

Figure 12:
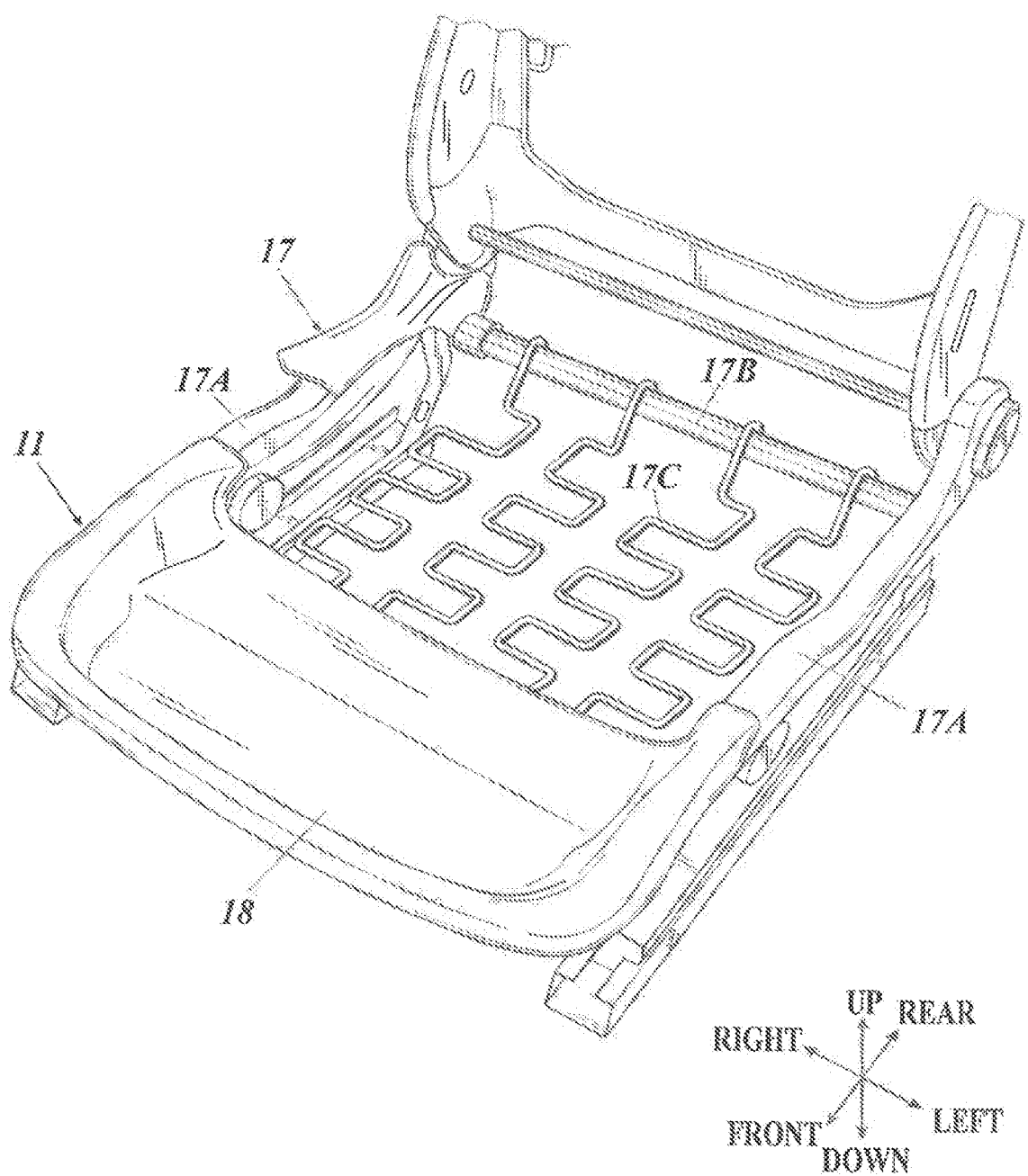
FIG. 12 is a schematic view illustrating an example of a seat cushion frame provided with a wire.

Here, in the above described embodiment, the case where the pan frame 18 which is disposed under the cushion pad 12 is used as the board-like member is described. However, the structure of the seat cushion frame 17 under the cushion pad 12 (not shown in FIG. 12), for example, may include the pan frame 18 and the wires 17C (also called S springs or the like) as shown in FIG. 12 or may only include the wires 17C and not the pan frame 18.

In such case, the board like member can be set at the section where the wires 17C are disposed.

At that time, for example, the board-like member 25 can be set at the section where the wires 17C are disposed so that the wires 17C be inserted therein as shown in FIG. 13. Further, in the way similar to that in the above described embodiment, the concave 26 can be formed in the upper surface of the board-like member 25 and the sensor 1 can be disposed in the concave 26 in the state where it is fixated to the attachment bracket 2.

Here, although the engaging units (see FIGS. 4 and 5) and the like for attaching the attachment bracket 2 in the concave 26 are not shown in FIG. 13, the engaging units and the like are formed in both the concave 26 and the attachment bracket 2 as needed. Although the harness 1A and the like of the sensor 1 are also not shown, the attachment bracket 2 can also include the guide unit 2d (see FIG. 4) and the like. In addition, the configuration of the concave 20, the attachment bracket 2 and the like according to the above described embodiment can be applied to the concave 26, the attachment bracket 2 and the like of the modification example as needed.

In the case of the modification example shown in FIG. 13, since the wires 17C are inserted in the board-like member 25, the parts of the concave 26 of the board-like member 25 where the wires 17C are inserted are raised comparing to the other parts (see the dotted lines in the drawing). Therefore, the cutouts 2e (see FIG. 4) of the attachment bracket 2 in the above described embodiment can be formed at the positions corresponding to the parts raised by the wires 17C which are inserted in the board-like member 25 as shown in FIG. 13.

By having such configuration, in addition to the functions and effects described in the above embodiment, the attachment bracket 2 and the parts raised by the wires 17C can be prevented from interfering with each other due to the attachment bracket 2 having the cutouts 2e formed at the parts corresponding to the parts raised by the wires 17C. Therefore, the attachment bracket 2, the board-like member 25 and the like can be prevented from being damaged and the like.

Here, it is needless to say that the present invention is not limited to the above described embodiment and modification example, and various modifications can be made as needed as long as they are within the scope of the invention.

What is claimed is:

1. A vehicle seat comprising:
 a seat cushion including a seat cushion frame and a cushion pad disposed on the seat cushion frame; and
 a sensor disposed under the cushion pad, wherein:
 an air passage through which air passes is formed in the cushion pad;
 the sensor is disposed so as to avoid a position directly under the air passage;
 a through hole connects the air passage to outside the cushion pad;
 the sensor is disposed so as to avoid a position directly under the through hole;
 a duct is inserted in the through hole; and
 the sensor is disposed in a position avoiding the duct.

2. The vehicle seat according to claim 1,
 wherein a harness is connected to the sensor, and
 wherein the harness is disposed so as to extend in a direction avoiding the duct.

3. The vehicle seat according to claim 2, wherein the harness is disposed so as to extend toward a side opposite of the duct with the sensor in between.

4. The vehicle seat according to claim 1, wherein the sensor is disposed in a position overlapped with the duct in a vertical direction when viewed from a lateral direction of the seat.

5. The vehicle seat according to claim 1, wherein a length of the sensor in a horizontal direction is longer than a length of the through hole in a horizontal direction.

6. The vehicle seat according to claim 1, further comprising:
 a seat back connected to the seat cushion;
 a headrest disposed in the seat back; and
 an outer cover that covers the seat cushion frame and the cushion pad, wherein a blower to take in air is positioned on a bottom side of the seat cushion, and wherein the sensor is fixed on a board member provided in the seat cushion frame using a bracket.

* * * * *